(12) United States Patent
Morozini de Lira et al.

(10) Patent No.: US 9,937,880 B2
(45) Date of Patent: Apr. 10, 2018

(54) SEAT ACTUATING ELEMENT FOR A MOTOR VEHICLE SEAT

(71) Applicant: Dr. Ing. h.c. F. Porsche Aktiengesellschaft, Stuttgart (DE)

(72) Inventors: Adriano Morozini de Lira, Stuttgart-Vaihingen (DE); Philipp Straub, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 255 days.

(21) Appl. No.: 14/813,168

(22) Filed: Jul. 30, 2015

(65) Prior Publication Data

US 2016/0031387 A1 Feb. 4, 2016

(30) Foreign Application Priority Data

Aug. 1, 2014 (DE) .................. 10 2014 110 938

(51) Int. Cl.
*B60R 16/00* (2006.01)
*B60N 2/02* (2006.01)

(52) U.S. Cl.
CPC .............. *B60R 16/005* (2013.01); *B60N 2/02* (2013.01); *B60N 2/0228* (2013.01)

(58) Field of Classification Search
CPC .. B60R 16/005; H01H 19/14; H01H 2221/01; H01H 2231/026; H01H 2239/03
See application file for complete search history.

(56) References Cited

U.S. PATENT DOCUMENTS

| 3,430,515 | A | * | 3/1969 | Lawrence, Jr. | G05G 1/08 74/527 |
| 4,678,872 | A | * | 7/1987 | Gutman | B60N 2/0228 200/329 |
| 5,152,187 | A | | 10/1992 | LaFemina | |
| 5,442,149 | A | * | 8/1995 | Sato | H01H 13/84 200/293 |
| 5,455,399 | A | * | 10/1995 | Kohno | B60N 2/0228 200/330 |
| 5,844,182 | A | * | 12/1998 | Hirano | B60N 2/0228 200/18 |
| 6,515,241 | B2 | * | 2/2003 | Saiki | B60N 2/0228 200/17 R |
| 6,709,188 | B2 | * | 3/2004 | Ushimaru | G05G 1/10 16/441 |
| 6,953,900 | B2 | * | 10/2005 | Sottong | H01H 25/002 200/5 A |

(Continued)

FOREIGN PATENT DOCUMENTS

| DE | 10261831 | 7/2004 |
| DE | 102007042765 | 3/2009 |

(Continued)

*Primary Examiner* — Timothy J Brindley
(74) *Attorney, Agent, or Firm* — Gerald E. Hespos; Michael J. Porco; Matthew T. Hespos

(57) ABSTRACT

A seat actuating element for a motor vehicle seat has an element head (9) and a guide rod (10) that is received movably in a seat wall (7) of the motor vehicle seat (1). The element head (9) is arranged on the seat wall (7) and can be actuated. The seat actuating element (6) has an adjustment protector (11) to avoid inadvertent actuation of the seat actuating element (6).

8 Claims, 4 Drawing Sheets

(56) References Cited

U.S. PATENT DOCUMENTS

| | | | | |
|---|---|---|---|---|
| 7,592,562 B1 * | 9/2009 | Vanderwege | .......... | H01H 19/14 |
| | | | | 200/336 |
| 8,247,713 B2 * | 8/2012 | Ui | .......... | H01H 15/16 |
| | | | | 200/5 R |
| 9,446,690 B2 * | 9/2016 | Shigematsu | .............. | B60N 2/22 |
| 2007/0278832 A1 * | 12/2007 | Weber | .................. | B60N 2/0232 |
| | | | | 297/1 |
| 2014/0210239 A1 * | 7/2014 | Yetukuri | .............. | B60N 2/0228 |
| | | | | 297/217.1 |

FOREIGN PATENT DOCUMENTS

| | | |
|---|---|---|
| DE | 102007046546 | 4/2009 |
| DE | 102011103581 | 12/2012 |
| EP | 1428699 | 6/2004 |

\* cited by examiner

SEAT ACTUATING ELEMENT FOR A MOTOR VEHICLE SEAT

CROSS REFERENCE TO RELATED APPLICATION

This application claims priority under 35 USC 119 to German Patent Appl. No. 10 2014 110 938.4 filed on Aug. 1, 2014, the entire disclosure of which is incorporated herein by reference.

BACKGROUND

1. Field of the Invention

The invention relates to a seat actuating element for a motor vehicle seat.

2. Description of the Related Art

Seat actuating elements for motor vehicle seats of motor vehicles are known. In particular, driver's and passenger's seats have seat actuating elements that function to adjust the seat horizontally and/or vertically. Seat actuating elements generally are attached laterally to the motor vehicle seats, as viewed in the driving direction, and are in a region of a seat surface of the motor vehicle seat so that operation is possible without problems. The convenient location of the seat actuating elements also makes inadvertent or involuntary actuation a possibility.

Some actuating elements for motor vehicles are designed to require a defined force load or to require movement of the actuating element into a defined position to avoid having an occupant injured by the actuating element.

For instance, EP 1 428 699 B1 discloses an air distribution system of a motor vehicle with an actuating element that can be pushed into a dashboard in the case of an impact of an occupant of the motor vehicle. The actuating element is constructed to avoid breakage of a component that interacts with the actuating element.

DE 10 2007 042 765 A1 discloses an actuating element for a motor vehicle that is lowered with respect to a trim part, dashboard or system board. After the lowering, the actuating element can be moved again into its original position.

DE 102 61 831 A1 discloses a soft-impact actuating element that can be lowered with respect to a dashboard in the case of an impact of an occupant. The actuating element has parts that are connected telescopically to one another and can be pushed inside one another.

DE 10 2007 046 546 A1 discloses a multi-way switch or multi-way rotary adjuster as an actuating element for a motor vehicle where at least two switches and/or rotary adjusters are arranged coaxially. Because of the function, one of the two switches and/or rotary adjusters has a greater projecting length than the other with respect to a trim part, dashboard or system board. The switch and/or rotary adjuster with the greater projecting length is moved to the level of the other switch and/or rotary adjuster in the case of an impact of an occupant on the actuating element.

Actuating elements that are locked on account of inadvertent contact or inadvertent touching of the occupant are known from the prior art. Here, the locking means is in immediate or direct contact with the occupant.

Immediate or direct contact of the occupant does not necessarily have to lead to an adjustment of the actuating element. This also applies to an unintended indirect contact, an object pushing or being pressed against the actuating element.

It is therefore the object of the invention to provide a seat actuating element for a motor vehicle seat, which seat actuating element can be locked automatically.

SUMMARY

The invention relates to a seat actuating element for a motor vehicle seat. The seat actuating element comprises an element head and a guide rod that can be received movably in a seat wall of the motor vehicle seat. The element head is arranged on the seat wall and can be actuated. The seat actuating element has an adjustment protection means to avoid a movement of the seat actuating element along a wall surface of the seat wall. The adjustment protection means brings about locking of the seat actuating element if a force acts in the direction of a longitudinal axis of the guide rod. It is not absolutely necessary that the action of force takes place exclusively in the direction of the longitudinal axis. However, one directional component of the force has to be configured in the direction of the longitudinal axis to bring about a locking action.

The small space between the vehicle door and the motor vehicle seat results in only a small space between a seat actuating element that usually is configured on the motor vehicle seat and the vehicle door. The seat actuating elements for electrically adjustable front seats of motor vehicles are attached in the form of pushbuttons or slides on a lateral seat bezel, called the seat wall in the following text. Contact can be made between the seat actuating element and an object that falls between the vehicle door and the motor vehicle seat or an object that is clamped between the motor vehicle seat and the vehicle door, for example, when the door is opened. As a result, actuation of the seat actuating element can occur by a force that acts on the corresponding seat actuating element as a consequence of the contact so that the position and inclination of the seat can change.

The advantage of the invention is that a blockage or locking action of the seat actuating element is caused with the aid of the adjustment protection means. Thus, an adjustment of the motor vehicle seat is suppressed.

The adjustment protection means may be configured to produce a positively locking connection and/or a non-positive connection between the seat wall and the seat actuating element. The positive and/or non-positive locking connection affords the option to release the locking action in contrast to an integral connection. A force directional component of the force that acts can be used in a targeted manner for the locking action in accordance with the design of the seat actuating element and the seat wall.

The element head of the seat actuating element may have a lower surface that faces the seat wall and an indentation may be formed on the lower surface. A bulge may be positioned on the seat wall at a position facing the indentation and may configured to engage the indentation to achieve the locking.

The seat actuating element can trigger the seat adjustment of the motor vehicle seat in the non-locked state. More particularly, the bulge can be configured in the region of the element head as a curved rail in the case of a rotatable element head and as a straight rail in the case of an axially displaceable element head. The seat wall is a trim part of the motor vehicle seat, and generally is manufactured from plastic. Thus, the bulge can be made simply in an injection molding process or another customary process.

The seat actuating element may be locked by a blocking element of the adjustment protection means. The blocking element may be on the guide rod and may be complementary to a receiving opening of the seat wall. For the locking action, a cross section of the blocking element may be greater in a region of the blocking element that faces the element head than in a region of the blocking element that faces away from the element head to achieve a locking action. The blocking element may taper in a direction toward an end of the guide rod that faces away from the element head.

Further advantages, features and details of the invention result from the following description of preferred exemplary embodiments and using the drawings. The features and combinations of features mentioned above and those mentioned below and/or are shown solely in the figures can be used in the respectively specified combination, in other combinations or on their own, without departing from the scope of the invention. Identical or functionally identical elements are assigned identical designations. For reasons of clarity, elements may not be provided with their designations in all figures.

DETAILED DESCRIPTION

Figure 1:
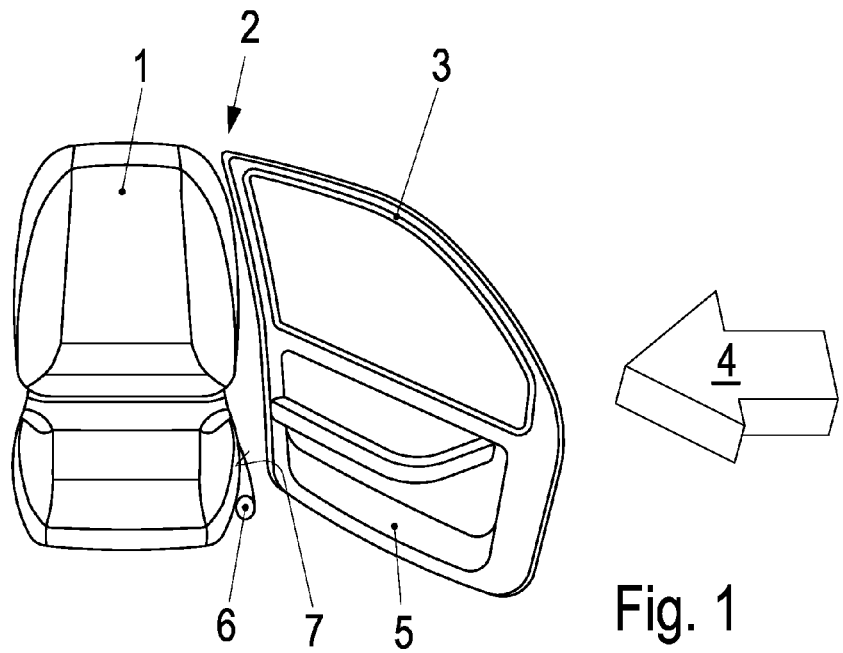
FIG. 1 shows a basic view of a motor vehicle seat and a vehicle door.

FIG. 1 shows a basic view of a motor vehicle seat 1 of a motor vehicle 2 and a vehicle door 3 of the motor vehicle 2. An object (not shown in greater detail) may be received on an inner face 5 of the vehicle door 3 in an inner tray. Such an object that is wider than the distance between the seat actuating element 6 and the inner tray may contact the seat actuating element 6 when closing of the vehicle door 3, and may exert a force from the direction of the arrow 4 on the seat actuating element 6 of the motor vehicle seat 1. This contact and force could trigger the seat actuating elements 6.

Figure 2:
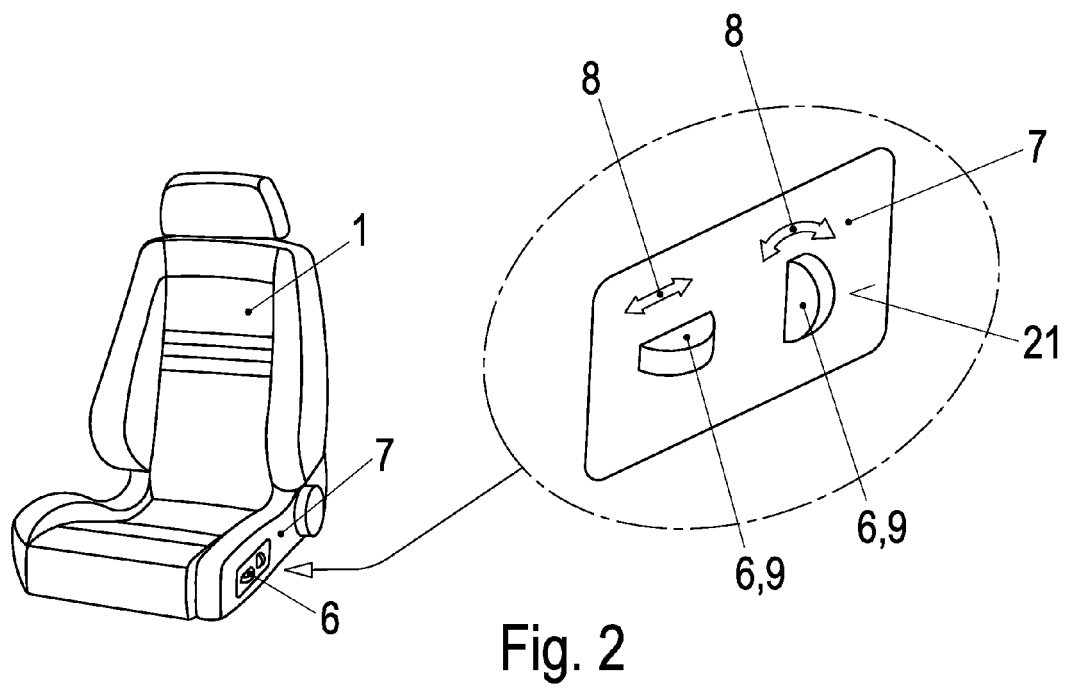
FIG. 2 shows a basic view of the motor vehicle seat with a view of the seat actuating elements thereof and an enlarged illustration of the seat actuating elements.

The seat actuating elements 6 are arranged on a seat wall 7 of the motor vehicle seat 1 that faces the vehicle door 3. FIG. 2 shows the motor vehicle seat 1 with a view of its seat actuating elements 6 and an enlarged illustration of the seat actuating elements 6 in an outline arrangement on the seat wall 7. The seat actuating elements 6 generally can be rotated about a rotational point, and can always be moved along a wall surface 21 of the seat wall 7, as shown with the aid of the movement arrows 8.

Figure 3:
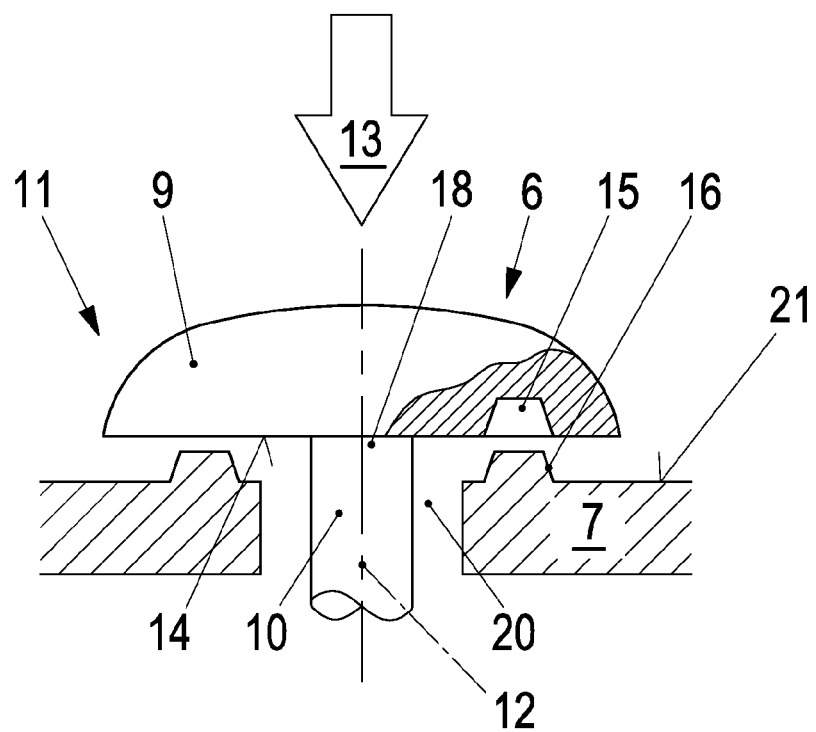
FIG. 3 shows a basic view of a seat actuating element according to the invention in a first exemplary embodiment.

FIG. 3 shows a first embodiment of the seat actuating element 6 of the invention. The seat actuating element 6 comprises an element head 9 and a guide rod 10. The element head 9 is connected fixedly to the guide rod 10 at a first end 18 of the guide rod 10. The guide rod 10 is received movably in a receiving opening 20 in the seat wall 7. The element head 9 can be actuated in the direction of the movement arrow 8, and the guide rod 10 likewise is moved. As a result, a corresponding electric motor (not shown in greater detail) of the motor vehicle seat 1 is operated.

The seat actuating element 6 has an adjustment protection means 11 to prevent inadvertent actuation of the seat actuating element 6. The adjustment protection means 11 prevents a movement of the seat actuating element 6 if the seat actuating element 6 is loaded by a force 13 axially along a longitudinal axis 12 of the guide rod 10. The adjustment protection means 11 is configured to produce a positively locking connection and/or a non-positive connection between the seat wall 7 and the seat actuating element 6.

The seat actuating element 6 has an indentation 15 on a lower face 14 of the element head 9 that faces the seat wall 7, and a bulge 16 is formed on the seat wall 7 to oppose the indentation 15. The bulge 16 and the indentation 15 have complementary shapes to bring about a positive locking connection. A force 13 that acts along the longitudinal axis 12 of the seat actuating element 6 presses the seat actuating element 6 toward the seat wall 7. Thus, the indentation 15 and the bulge 16 form a positively locking connection so that an adjusting movement along the wall surface 21 is not possible.

Figure 4:
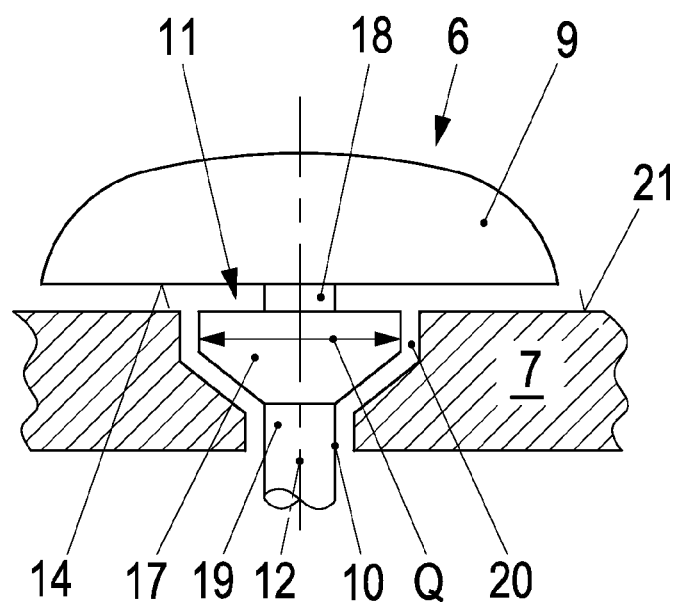
FIG. 4 shows a basic view of the seat actuating element according to the invention in a second exemplary embodiment.

FIG. 4 illustrates a second embodiment where the guide rod 10 has a blocking element 17 of the adjustment protection means 11. The blocking element 17 spans the guide rod 10 in the region of the seat wall 7. The blocking element 17 is configured to form a positive locking and non-positive connection with the seat wall 7. To produce the positively locking connection, the blocking element 17 has a greater cross section Q in its region that faces the element head 9 than in its region that faces away from the element head 9. In other words, the blocking element 17 is conical, and a tip of the cone faces away from the element head 9 and toward a second end 19 of the guide rod 10. The receiving opening 20 is configured to be complementary to the blocking element 17. As a result, the blocking element 17 forms a positively locking connection and a non-positive connection due to friction with the receiving opening 20 in the case of a force that acts on the seat actuating element 6 along the longitudinal axis 12. As a result, movement of the seat actuating element 6 along the wall surface 21 is prevented.

Figure 5:
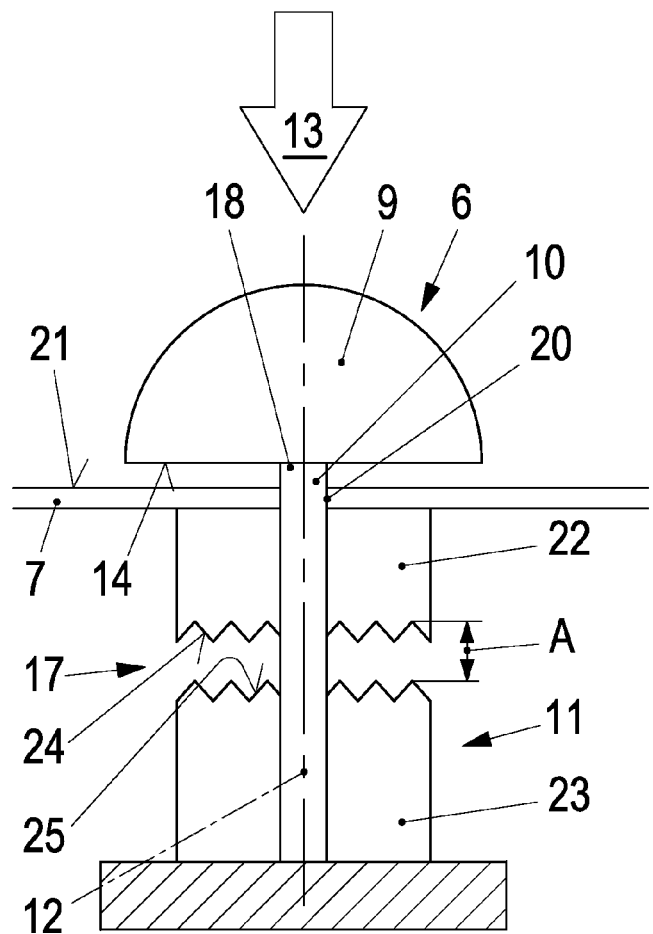
FIG. 5 shows a basic view of the seat actuating element according to the invention in a third exemplary embodiment.

FIG. 5 shows a third embodiment of the seat actuating element 6 where the guide rod 10 partially has the blocking element 17 of the adjustment protection means 11. The blocking element 17 includes a first blocking element part 22 that is fixed on the seat wall 7 and a second blocking element part 23 that is fastened to the guide rod 10. The two blocking element parts 22, 23 are spaced from one another by a spacing A. The second blocking element part 23 spans the guide rod 10 completely over its circumference. However, the second blocking element part 23 might also be configured to span the guide rod 10 only partially over its circumference.

The first blocking element part 22 has a first blocking face 24 that is configured to oppose the second blocking element part 23. The second blocking element part 23 has a second blocking face 25 that opposes and is complementary to the first blocking face 24. In this third embodiment, the blocking faces 24, 25 are of tooth-like shape and block movement of the seat actuating element 6 along the wall surface 21 when the individual teeth of the blocking faces 24, 25 engage one another. Teeth of the first blocking face 24 lie opposite tooth bases of the second blocking face 25. In this way, a positively locking connection and a non-positive connection are achieved here if the seat actuating element 6 is loaded with a force that acts in the direction of the longitudinal axis 12. In one exemplary embodiment that is not shown in greater detail, the two blocking faces 24, 25 are of undulating configuration and are positioned so that a positively locking and non-positive connection also are made possible.

Figure 6:
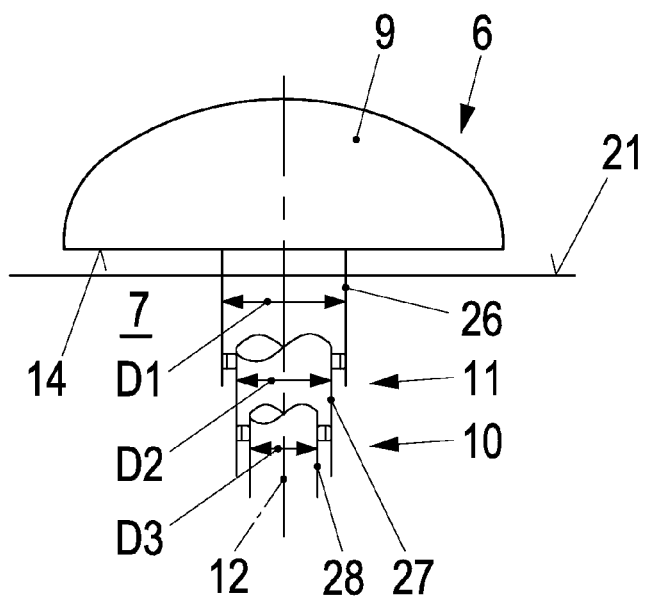
FIG. 6 shows a basic view of the seat actuating element according to the invention in a fourth exemplary embodiment.

FIG. 6 shows a fourth embodiment. The guide rod 10 is of telescopic design and has a first rod section 26 that is configured to face the element head 9. The first rod section 26 has a first diameter D1 that is greater than a second diameter D2 of a second rod section 27 that is received partially in the first rod section 26. A third diameter D3 of a third rod section 28 is smaller than the second diameter D2, the third rod section 28 is received partially in the second rod section 27. With the aid of the guide rod 10 of telescopic configuration or with the aid of the diameters D1, D2, D3 which are configured in the manner of a cascade, a locking action of the seat actuating element 6 is achieved if the seat actuating element 6 is loaded with a force that acts in the direction of the longitudinal axis 12. The rod sections 26, 27, 28 are coaxial, the adjustment protection means 11 is configured to produce a positively locking connection in the direction of the longitudinal axis 12 due to the decreasing diameter of the individual rod sections 26, 27, 28.

Figure 7:
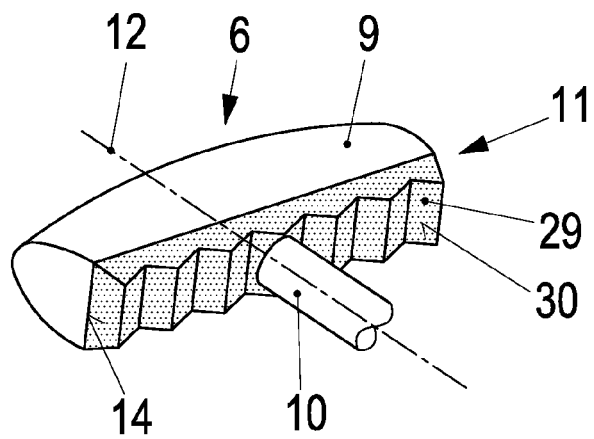
FIG. 7 shows a basic view of the seat actuating element according to the invention in a fifth exemplary embodiment.

FIG. 7 shows a fifth embodiment of the seat actuating element 6 according to the invention. The element head 9 has a lower face 14 with friction lining 29 that has a high coefficient of friction. In other words, the friction lining 29 is rough at least on the surface 30 that can be positioned to face the wall surface 21, or a surface roughness of the surface 30 can bring about a non-positive connection between the wall surface 21 and the surface 30 if the seat actuating element 6 is loaded with a force in the direction of the longitudinal axis 12. The surface 30 may have an uneven or serrated profile relative to the wall surface 21 to further increase the non-positive connection. The friction lining 29 may be made from an elastomer, such as ethylene-propylene-diene rubber.

Figure 8:
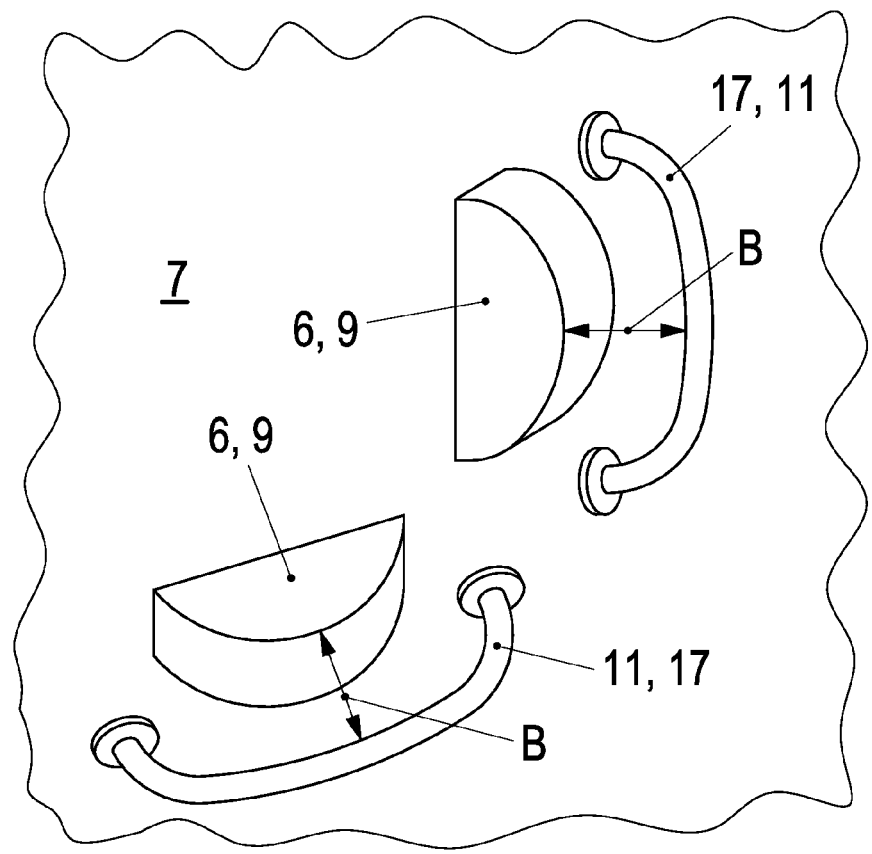
FIG. 8 shows a basic view of a detail of an inner face of the vehicle door with seat actuating elements in a sixth exemplary embodiment.

FIG. 8 shows a sixth embodiment of the seat actuating element 6. The adjustment protection means 11 is a guard hoop 17 that spans the element head 9 in its axial extent while maintaining a further spacing B. As a result, the guard hoop 17 is loaded with a force, and the seat actuating element 6 is protected against erroneous actuation by the spacing B between the guard hoop 17 and the element head 9.

What is claimed is:

1. A seat actuating element for adjusting a position of a motor vehicle seat, the seat actuating element mounted on a seat wall of the motor vehicle seat and comprising:
    a guide rod received movably in an opening in the seat wall, the guide rod having an axis arranged substantially normal to the seat wall, the guide rod being movable in at least one direction normal to the axis of the guide rod to adjust the position of the motor vehicle seat;
    an element head mounted on the guide rod, the element head having a facing surface spaced from and facing the seat wall, and a pressing surface opposite the facing surface, at least one indentation provided in the facing surface of the seat actuating element and extending towards the pressing surface, the at least one indentation having a cross-section that narrows from the facing surface towards the pressing surface; and
    at least one protrusion projecting from the seat wall at a position facing the at least one indentation and configured to be inserted into the at least one indentation, wherein
    the at least one protrusion is received in the at least one indentation to prevent movement of the guide rod normal to the axis of the guide rod to form a non-positive connection to prevent inadvertent actuation of the seat actuating element.

2. The seat actuating element of claim 1, wherein the guide rod (10) has a blocking element (17) of the adjustment protector (11), the blocking element (17) being of complementary configuration with respect to a receiving opening (20) of the seat wall (7), the receiving opening (20) receiving the guide rod (10) movably.

3. The seat actuating element of claim 2, wherein the blocking element (17) tapers toward an end (19) of the guide rod (10) that faces away from the element head (9).

4. The seat actuating element of claim 1, wherein the guide rod (10) is of telescopic configuration.

5. The seat actuating element of claim 1, wherein the adjustment protection means (17) has a first blocking element part (22) on a first blocking element face (25) and a second blocking element part (23) and a second blocking element face (25) that is opposed to the first blocking element face (25), the first and second blocking element parts (22, 23) being configured in a complementary and positively locking manner, and the first blocking element part (22) or the second blocking element part (23) being fixed on the guide rod (10).

6. The seat actuating element of claim 1, wherein a face (14) of the element head (9) that faces the seat wall (7) has a friction lining (29).

7. The seat actuating element of claim 1, wherein the adjustment protector (11) has a blocking element (17) that spans the element head (9) in its axial extent while maintaining a further spacing (B).

8. The seat actuating element of claim 1, wherein the motor vehicle seat is electrically adjustable.

* * * * *